United States Patent [19]
Schulz et al.

[11] 4,059,028
[45] Nov. 22, 1977

[54] MULTIPLE SPEED HUB WITH COASTER BRAKE

[75] Inventors: Horst Schulz, Friedrichshafen; Josef Flösser, Schweinfurt am Main; Reinhard Kessler, Schwebheim; Karl-Heinz Schmidt, Schweinfurt am Main; Ewald Eisend, Grafenrheinfeld; Erich Hild, Schweinfurt am Main; Karl-Heinz Löffler, Hassfurt; Werner Steuer, Oerlenbach, all of Germany

[73] Assignee: Fichtel & Sachs AG, Schweinfurt am Main, Germany

[21] Appl. No.: 670,521

[22] Filed: Mar. 25, 1976

[30] Foreign Application Priority Data
Apr. 2, 1975 Germany .............................. 2514418

[51] Int. Cl.$^2$ ............................................ F16H 3/44
[52] U.S. Cl. .................................. 74/781 B; 74/750 B

[58] Field of Search ........................... 74/750 B, 781 B

[56] References Cited
U.S. PATENT DOCUMENTS

| | | | |
|---|---|---|---|
| 1,277,070 | 8/1918 | Harrison | 74/750 B |
| 2,854,108 | 9/1958 | Douglas | 74/750 B X |
| 3,809,195 | 5/1974 | Schulz et al. | 74/750 B X |
| 3,886,811 | 6/1975 | Hillyer | 74/750 B |

*Primary Examiner* — James F. Coan
*Attorney, Agent, or Firm* — Hans Berman

[57] ABSTRACT

In a multiple speed hub with coaster brake for a bicycle, unintentional jamming of the brake is prevented by the provision of novel pawl clutches interposed between a planetary transmission and the hub shell. The recesses of pawl carriers pivotally receiving the clutch pawls are circumferentially oversized to permit limited circumferential movement of each pawl between a driving position and an idling position.

10 Claims, 4 Drawing Figures

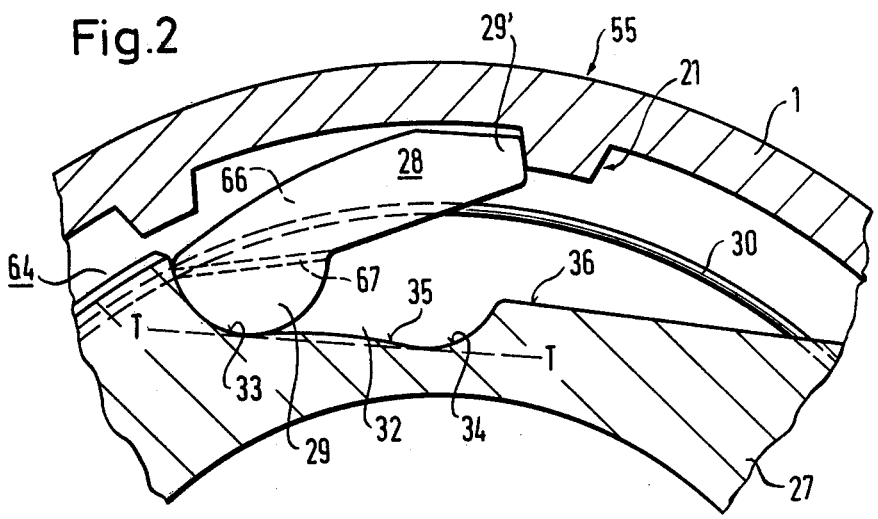
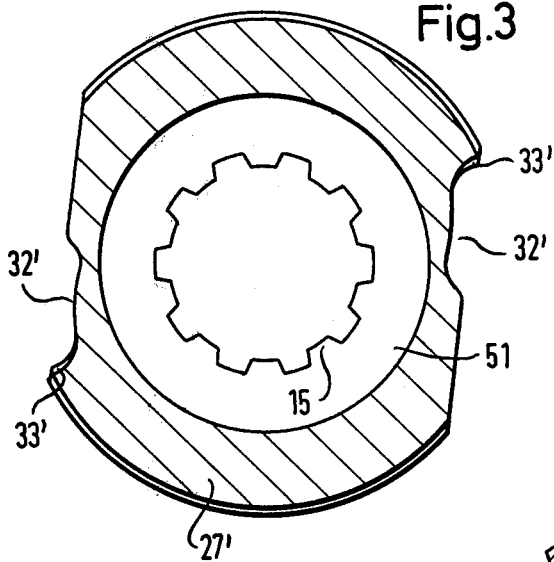
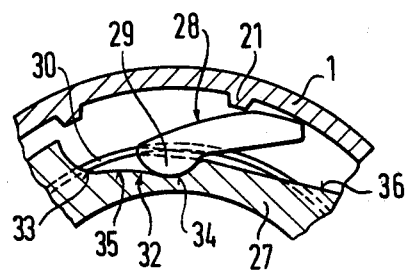

MULTIPLE SPEED HUB WITH COASTER BRAKE

This invention relates to multiple-speed hubs for bicycles and like vehicles, and particularly to an improved multiple-speed hub in which jamming of a coaster brake under certain operating conditions is prevented in a simple and effective manner.

In its more specific aspects, the invention relates to an improvement in an otherwise conventional hub in which a driver may be coupled alternatively to the planet carrier and the ring gear of a planetary transmission. Pawl clutches transmit driving torque from the coupled planet carrier or ring gear to the hub shell enclosing the transmission during forward pedaling, and a brake member threadedly mounted on the ring gear is shifted axially during back pedaling into a position of braking action on the hub shell.

Unless some idling motion is provided between the transmission elements and the hub shell, the brake may be jammed unintentionally if back pedaling is followed immediately by forward pedaling, and forward torque is transmitted to the ring gear while the coaster brake is still engaged with the hub shell. Jamming of the brake may also occur if the rider brakes the bicycle to a standstill, dismounts, and then pushes the bicycle rearward.

It has been proposed to avoid such jamming by interposing a torque transmitting element between the pawls and the hub shell, the element being capable of limited rotary movement relative to the hub shell (German Pat. No. 1,092,791). It has further been proposed to provide a pawl carrier with two parallel slots, to mount a shaft for movement in the slots, and to support a pawl on the shaft (U.S. Pat. No. 1,277,070). Both known devices are relatively complex and therefore subject to breakdown after a relatively short life.

It is a primary object of the invention to provide a multiple-speed hub of the type described with a simpler and more reliable arrangement for preventing unintentional jamming of the coaster brake in the hub.

The invention thus provides a multiple-speed hub for a bicycle and like vehicle whose shaft is normally fixedly mounted on the vehicle frame. A tubular driver is mounted of the shaft for rotation about the axis of the shaft. The two axially terminal portions of a hub shell are similarly mounted on the shaft and the driver. A multiple-speed planetary transmission is drivingly interposed in the hub shell between the driver and the shell.

The transmission includes a sun gear fixed on the shaft, a planet carrier member and an internally toothed ring gear member rotatable about the shaft axis, at least one planet gear rotatably mounted on the planet carrier member in simultaneous meshing engagement with the sun and ring gears, a coupling element secured to the driver for joint rotation, a shifting mechanism for shifting the coupling element between positions of driving engagement with the planet carrier member and the ring gear member respectively, and two overrunning clutches drivingly interposed between the hub shell and the two afore-mentioned members.

At least one of the clutches includes a driven portion and a driving portion radially offset and respectively secured to the associated transmission member and to the hub shell for simultaneous rotation about the shaft axis. One of the clutch portions is formed with a recess radially open toward the other clutch portion, and abutments circumferentially bound the recess in two opposite directions. The clutch further includes a pawl having a pivot part and an engagement part. The pivot part is received in the recess for pivoting movement of the pawl toward and away from a position of engagement of the engagement part with the other clutch portion and for circumferential movement of the pawl between respective positions of engagement of the pivot part with the afore-mentioned abutments.

A brake member is mounted on the planet carrier or the ring gear member for threaded movement about the shaft axis toward and away from an axial position of braking action on the hub shell. An auxiliary braking device yieldably impedes rotation of the brake member relative to the shaft, whereby axial movement of the brake member relative to the supporting transmission member is caused when the transmission member rotates about the shaft axis.

Other features, additional objects, and many of the attendant advantages of this invention will readily be appreciated as the same becomes better understood by reference to the following detailed description of a preferred embodiment and of a modification of the same when considered in connection with the appended drawing in which:

FIG. 2 illustrates a portion of the hub of FIG. 1 in enlarged section on the line II—II;

FIG. 3 shows elements of a modification of the hub of FIG. 1 in a section corresponding to the line II—II; and FIG. 4 is a view corresponding to that of FIG. 2, but on a smaller scale and illustrating a different operating condition of the hub.

Figure 1:
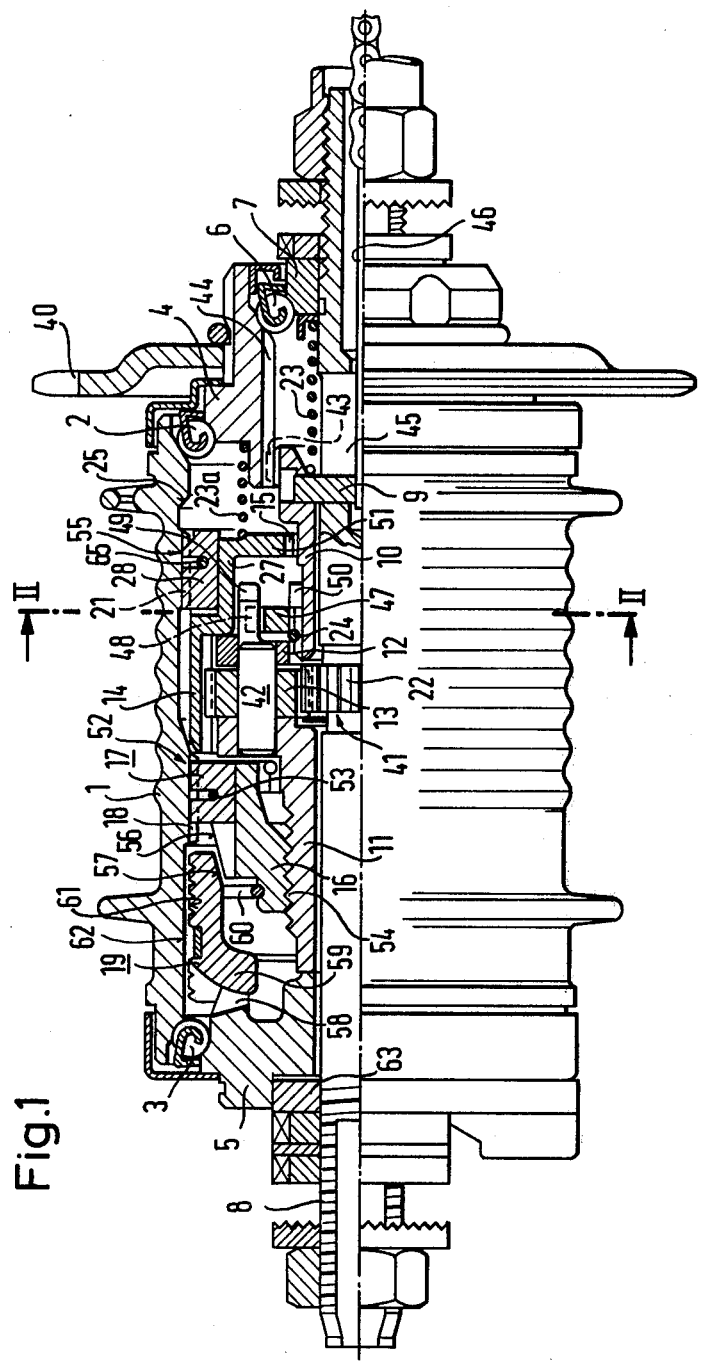
FIG. 1 shows a bicycle hub according to the invention in rear elevation and partly in section on its axis.

Referring now to FIG. 1 in detail, there is seen a three-speed bicycle hub with coaster brake whose movable parts are mounted on a shaft 8 normally fixed in the bicycle frame. Bearing rings 7, 5 fixedly mounted on the two axial ends of the shaft 8 carry respective sets of bearing balls 6, 3. A tubular driver 4 carrying a chain sprocket 40 rotates on the balls 6 and supports another set of bearing balls 2. The two axial ends of a hub shell 1 are rotatably supported on the balls 2, 3.

The hub shell 1 encloses a planetary gear transmission 41 including a sun gear 22 fixed on or integral with the shaft 8, a planet carrier 11 and an internally toothed ring gear 14. Three planet gears 13 are distributed about the shaft 8 on respective planet shafts 42 equiangularly spaced on the planet carrier 11, only one planet gear being shown. The planet gears simultaneously mesh with the sun gear 22 and one set of internal teeth on the ring gear 14.

A coupling sleeve 10 is axially slidable in the driver 4, but is connected to the driver for joint rotation in all axial positions by interengaged ribs or teeth 43, 44. A slide 9 is axially movable in a slot 45 of the shaft 8. It engages an opening in the sleeve 10 and shifts the sleeve when the slide 9 is moved axially by a manually operated, conventional speed changing mechanism 46, only partly illustrated.

A radial disc 47 is secured on the axial end of the sleeve 10 remote from the driver 4 by means of a retaining ring 24 and has circumferentially spaced radial projections 48 interengaged in the sleeve position of FIG. 1 with axial projections 49 on an annular disc 12 fastened to the planet shafts 41. External ribs or teeth 50 on the coupling sleeve 10 are engaged with internal teeth 15 on the ring gear 14 when the sleeve is shifted one step toward the right from the illustrated position by the speed changing mechanism 46 against the restraint of a helical compression spring 23 until the disc 47 on the sleeve 10 abuts against a radial flange portion 52 of the ring gear 14. If the sleeve 10 is shifted a second step toward the right, the disc 47 entrains the ring gear 14 against the restraint of a helical compression spring 23a while the sleeve 10 remains coupled to the ring gear by the engaged teeth 50, 15.

Two pawl clutches 52, 55 are drivingly interposed between the planet carrier 11 and the ring gear 14 respectively and the hub shell 1. The clutch 52 is connected with the planet carrier 11 by means of a brake actuating element 16 movable on the planet carrier on engaged threads 54. The element 16 serves as a carrier for two pivotally mounted pawls 17 which are biased by an annular pawl spring 53 toward engagement with a ratchet 18 on the inner face of the hub shell 1.

The other pawl clutch 55 is connected with the ring gear 14. An integral portion 27 of the ring gear provides a carrier for two pawls 28 biased toward engagement with a ratchet 21 on the hub shell 1 by a pawl spring 30, as will presently be described in more detail with reference to FIGS. 2 and 4.

In the position of the coupling sleeve 10 shown in FIG. 1, torque is transmitted during forward pedaling from the sprocket 40 and the driver 4 to the hub shell 1 by the planet carrier 11, the planet gears 13, the ring gear 14, and the clutch 55. The rotary speed of the hub shell 1 is greater than that of the driver 4. The ratchet 18 turns faster than the associated pawls 17.

When the sleeve 10 is shifted one step toward the right from the position of FIG. 1, torque is transmitted from the driver 4 to the hub shell 1 by the ring gear 14 and the clutch 55. The hub shell rotates at the same speed as the driver, and the ratchet 18 turns faster than the associated pawls 17.

When the sleeve 10 is moved into the extreme right position, a conically tapering, inner surface 25 of the hub shell 1 engages the pawls 28 and retracts them from engagement with the ratchet 21. Torque is transmitted from the driver 4 to the hub shell 1 sequentially by the ring gear 14, the planet gears 13, the planet carrier 11, brake actuating element 16, and clutch 52. The hub shell 1 rotates at a speed lower than that of the driver 4.

The brake actuating element 16 has an outer conical surface 56 coaxial with an internal conical surface 57 of a split brake sleeve 19 secured against rotation by projections 58 interengaged with projections 59 on the fixed bearing ring 5. An auxiliary spring 60 fastened to the sleeve 19 and frictionally engaging the element 16 impedes rotation of the element 16 with the planet carrier 11. The threads 54 are so inclined that the brake actuating element moves axially toward the left, as viewed in FIG. 1, when the planet carrier 11 is turned by back-pedaling. The sleeve 19 is spread radially by the engageing element 16, and an outer braking face 61 of the sleeve 19 frictionally engages a cooperating inner braking face 62 of the hub shell 1. The braking movement is normally transmitted from the bearing ring 5 to the bicycle frame by a lever 63.

As is better seen in FIG. 2, each pawl 28 of the clutch 55 has a pivot part 29 and an engagement part 29' which tapers towards its free end. The pawl is a unitary, imperforate metal body. The pivot part 29 has a cylindrically arcuate, convex outer face about an axis of curvature parallel to the axis of the shaft 8. It is received in a recess 32 of the pawl carrier 27 which is open in a radially outward direction and in both axial directions. The recess 32 is bounded circumferentially by end faces 33, 34 of the pawl carrier 27 which are cylindrically concave and have each a radius of curvature substantially equal to that of the convex outerface of the pivot part 29. The end faces 33, 34 are connected by the bottom face 35 of the recess 32 which is cylindrically convex and whose radius of curvature is so long that its greatest spacing from a plane of reference T tangential to both end faces 33, 34, approximately midway between the two end faces, is only 10 to 20% of the approximately common radius of curvature of the end faces 33, 34 and of the convex outer face of the pivot part 29.

The axis of curvature of the end face 34 is nearer the axis of the shaft 8 than the axis of curvature of the end face 33 so that the bottom face 35 has an overall slope approaching the hub axis from the end face 33 toward the end face 34. The greatest circumferrential dimension of the recess 32 between the end faces 33, 34 is approximately four times the radius of curvature of the end faces.

The pawl 28 is secured to the pawl carrier 27 solely by the annular pawl spring 30 received under its own resilient pressure in a circumferential groove 64 of the pawl carrier 27 and an aligned groove 66 in the outer circumferential face of each pawl 28. The spring engages the bottom 67 of the groove 66 closely adjacent the end face 33 and thereby angularly biases the pawl 28 into the position shown in FIG. 2 in which the engagement portion 29' of the pawl drivingly engages a tooth of the ratchet 21 on the hub shell 1. The spring 30 also biases the pawl 28 circumferentially to move along the bottom face 35 toward the hub axis, and thereby toward the end face 34, and only the engagement of the pawl with the ratchet 21 prevents such movement.

A further recess 36 extends in the otherwise cylindrical pawl carrier 27 circumferentially from the end face 34 away from the end face 33. It is dimensioned to receive at least a portion of the engagement part 29' when the pawls 28 are retracted from the ratchet 21 by the conical hub shell face 25 in the low-speed condition of the transmission 41.

During coasting and during back-pedaling for braking, the hub shell 1 rotates clockwise, as viewed in FIGS. 2 and 4, while the pawl carrier 27 stands still or moves counterclockwise. The teeth of the ratchet 21 then slide over the outer face of the pawl 28 and pivot the pawl clockwise. They also frictionally drive the pawl from the end face 33 toward the end face 34 with the assistance of the spring 30, as discussed above, until the convex face of the pivot part 29 conformingly engages the end face 34.

When forward pedaling is resumed after braking, the pawl carrier 27 turns clockwise from the position of FIG. 4, but torque cannot be transmitted by the pawl 28 until the pivot part 29 has traveled along the bottom face 35 into the position of conforming engagement with the end face 33. The distance traveled is sufficient to release the brake actuating element 16 from the brake sleeve 19 by rotation of the planet carrier 11, and thereby to deactivate the coaster brake. Jamming of the brake is safely prevented. The same mode of operation prevents jamming of the engaged brake if the bicycle is rolled backward after braking.

As can readily be deduced from FIG. 2, radii drawn on the axis of the shaft 8 from the axes of curvature of the end faces 33, 34 enclose an angle of approximately 18°. Such an angle has been found to provide the necessary length of pawl travel in the recess 32 without unduly weakening the pawl carrier 27.

In the commonly assigned, copending application Ser. No. 577,753, filed on May 15, 1975, now U.S. Pat. No. 3,995,503 one of us has disclosed a bicycle hub in which the pawls of pawl clutches are obliquely inclined relative to the hub axis, and the multiple speed hub shown in FIGS. 1, 2, and 4 may readily be modified in a corresponding manner as is partly shown in FIG. 3. The two pawls of the modified hub, not themselves shown in FIG. 3, are received in recesses 32' of a pawl carrier 27'. The recesses 32' are circumferentially bounded by end faces 33' whose axes of cylindrical curvature are obliquely inclined relative to the axis of the hub in the stationary shaft. FIG. 3 also shows the unchanged flange portion 51 of the ring gear 14 and its internal teeth 15.

The clutch 52, not specifically shown in detail, may be conventional or closely analogous to the clutch 55, and the pawls 17 may be received in circumferentially oversized recesses of the brake actuating element 16. If the hub is modified to mount the threaded element 16 on the ring gear instead of the planet carrier, as is known in itself, such a modification of the clutch 52 is particularly advantageous.

It is common preferred practice to provide the driving ratchets of pawl clutches on the hub shell and to mount the associated driven pawls on coaxially rotating elements of the planetary gear transmission. However, this relationship may be reversed if special conditions so require so that the pawls are secured to the hub shell for joint rotation while ratches on the transmission elements are the input or driven portions of the clutches. The necessary modifications of cooperating other members of the hub will readily suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a multiple-speed hub for a bicycle and like vehicle including a shaft defining an axis of rotation; a tubular driver mounted on said shaft for rotation about said axis; a hub shell having two axially terminal portions mounted on said shaft and on said driver respectively for rotation about said axis; a multiple-shaped planetary transmission drivingly interposed in said hub shell between said driver and said hub shell, said transmission including a sun gear fixed on said shaft, a planet carrier member and an internally toothed ring gear member rotatable about said axis, a planet gear rotatably mounted on said planet carrier member in simultaneous meshing engagement with said sun gear and with said ring gear member, a coupling element secured to said driver for joint rotation, shifting means for shifting said coupling element between positions of driving engagement with said members respectively, and two clutches drivingly interposed between said hub shell and said members respectively, one of said clutches including: a driven portion and a driving portion respectively secured to a first one of said members and to said hub shell for simultaneous rotation about said axis, said portions being radially offset, one of said portions being formed with a recess radially open toward the other portion, a pawl having a pivot part and an engagement part, said pivot part being received in said recess for pivoting movement of said pawl toward and away from a position of engagement of said engagement part with said other portion; a brake actuating element supported on one of said members for threaded movement about said axis toward and away from an axial position of braking action on said hub shell; and yieldable means impeding rotation of said brake actuating element relative to said shaft, whereby axial movement of said brake actuating element relative to said supporting member is caused when said supporting member rotates about said axis; the improvement in said one clutch which comprises:
   a. two circumferentially spaced end faces of said one portion bounding said recess in two opposite circumferential directions,
      1. said end faces being cylindrically arcuate about respective axes of curvature,
      2. a cylindrically convex face of said pivot part being shaped for conforming, movable engagement with each of said end faces;
   b. a convexly arcuate bottom face of said one portion bounding said recess in a radially inward direction,
      1. one of said axes of curvature being nearer said axis of rotation than the other axis of curvature, whereby said bottom face slopes from one of said end faces toward the other end face in a radially inward direction,
      2. the length of said bottom face being sufficient for permitting circumferential movement of said pawl in said recess between respective positions of engagement of said pivot part with said end faces.

2. In a hub as set forth in claim 1, two radii respectively drawn from said axis of rotation on said axes of curvature diverging at an angle of about 18°.

3. In a hub as set forth in claim 1, wherein said recess is open in both axial directions, said one clutch further including an annular pawl spring biasing said pawl toward said position of engagement and constituting the sole means securing said pawl to said one portion.

4. In a hub as set forth in claim 1, wherein said one portion is the driven portion secured to said ring gear.

5. In a hub as set forth in claim 1, further comprising pawl spring means biasing said pawl toward said position of engagement of said engagement part with said other portion and biasing said pivot part circumferentially away from one of said end faces toward engagement with the other end face.

6. In a hub as set forth in claim 1, wherein said end faces define a reference plane tangential to both end faces, the maximum spacing of said bottom face from said reference plane being 10 to 20% of the radius of curvature of each of said end faces.

7. In a hub as set forth in claim 6, wherein said bottom face is cylindrically arcuate about an axis of curvature spaced from said axis of said shaft.

8. In a hub as set forth in claim 1, wherein the maximum, circumferential spacing of said end faces is approximately four times the radius of curvature of each end face.

9. In a hub as set forth in claim 1, wherein said one portion is formed with a secondary recess dimensioned for receiving said engagement part.

10. In a hub as set forth in claim 1, wherein said pivot part is spaced from said other portion in all operative positions of said pawl.

* * * * *